Patented July 21, 1931

1,815,160

UNITED STATES PATENT OFFICE

RUDOLPH S. OPPENHEIM, OF SEATTLE, WASHINGTON

PROCESS FOR THE RECOVERY OF PROTEIN MATTER FROM LIQUIDS CONTAINING THE SAME

No Drawing.    Application filed May 26, 1928.    Serial No. 280,959.

This invention relates to a process for the recovery of protein matter from liquids containing the same and aims primarily to provide a novel process whereby protein matter suspended in a liquid in a very finely divided state may be completely and readily recovered without resorting to or employing evaporation.

More specifically the present invention contemplates a process for treating and recovering all of the protein matter contained in packing-house tank or stick water, distillery slop, or the like; which consists of introducing into the protein containing liquid to be treated a coagulative liquid and thoroughly intermixing the same therewith; then alkalizing the intermixture; then acidifying the same; which alkalization and acidification causes coagulation of the coagulative liquid and the coagulum or heavy flocculent precipitate thus formed unites with and envelops the minute particles of protein matter in suspension in the liquid being treated so that such particles are precipitated therewith; following which the supernatant liquid, having been completely freed of all protein matter, is drained off and discarded; the precipitate or residuent solid matter, containing all of the proteins formerly suspended in the treated liquid, is then discharged and dried, following which it is ground or pulverized for use as a food product, all of which are important features and objects of the invention and are to be correlated in the broad aim of enhancing the efficiency of the process and to secure the complete recovery of all protein matter contained in the treated liquid.

The above, and additional objects, which will hereinafter be more specifically treated are attained in the manner set forth in the following specification and then more clearly pointed out in the claims, which are appended hereto and form part of this application.

In the present disclosure, while I have elected to describe my process as applied to the recovery of protein matter from packing-house tank or stick water, distillery slop, or the like, I desire to have it understood that such process may be employed in the recovery of such matter from many other liquids containing the same, the specific examples mentioned herein being merely by way of illustration.

Before taking up the detailed description of the process evolved by the present invention, a general exposition of the specific advantages, features and purposes of the same will be undertaken. Heretofore, in the recovery of protein matter and other organic substances from packing-house tank or stick water, it has been customary to employ costly evaporation and drying processes, which necessitated complete evaporation of the tank water in order to recover the solid matter contained therein, and the subsequent drying of such solid matter, which due to its viscous nature was extremely difficult and costly to handle, and the further disadvantage that the resultant product could only be utilized as fertilizing material. Further, by employing the evaporation processes heretofore in use it has been physically impossible to recover only the protein matter from the tank water, for reasons that are obvious and apparent. Such protein matter could not heretofore be separated from the other solids contained in the tank water by evaporation.

It is therefore, a primary object of the present invention to provide a process for recovering only the highly nutritious and valuable protein matter from packing-house tank or stick water, distillery slop, or the like, so that the protein free solid matter, which is practically of no value, is left in the treated tank water or slop and is discarded therewith. A further primary object of this invention is the utilization of the recovered highly nutritious and valuable protein matter as a chicken food, where heretofore it had been utilized only as fertilizing material, and in consequence such protein matter when utilized as a chicken food commands a much higher price than when utilized, as it formerly was, as fertilizing material. A still further primary object is the provision of a process which requires only a fraction of the cost and time of the evaporation processes heretofore in use. A still further primary object and advantage of the present process is that any volume of tank water or slop may be simultaneously and rapidly treated so that the possibility of the tank water becoming sour and ill-smelling is substantially eliminated.

As hereinbefore set forth, the present process eliminates necessity of employing evaporation and its attendant excessive costs, and as a substitute therefore contemplates employing the coagulative qualities and properties of milk to precipitate the highly nutritious protein matter, contained in tank water or distillery slop, in the form of a coagulum, which latter when dried and ground is ready for use as a chicken food. Actual experience under working conditions has demonstrated that by employing milk as the precipitating agent all of the protein matter in the liquid being treated is completely recovered and utilized as a food product, thus it will be observed that the present simplified process is both economical and efficient. So far as I am aware no one heretofore has successfully or commercially recovered only protein matter from tank water or distillery slop by precipitation.

The apparatus ordinarily employed with the present process is relatively simple comprising as it does a cone-shaped treating tank, or series of cone-shaped treating tanks depending upon the volume of tank water or distillery slop to be treated, agitating apparatus for the liquids being treated, steam coils disposed in the conical portions of said tanks, and a rotary drier or driers for drying the precipitates. In practice I have found it expedient to employ tanks of approximately 2300 gallon capacity, each of which is equipped with a series of drain cocks at different elevations or levels, whereby the supernatant liquid is drawn off and at its lower end is equipped with an outlet valve through which the precipitate is discharged to the rotary driers.

Before describing the preferred procedure for treating packing-house tank or stick water to recover the minute particles of protein matter in suspension therein, it may be well to state, that tank water usually has a specific gravity of 4° Baumé and consists approximately of 92% water and 8% solid or stick matter, which latter contains approximately 20% protein matter and 80% of organic protein free matter. The tank water when received from the packing-house cookers is usually quite hot, but actual experience has demonstrated that the best results are obtained if such tank water is maintained during the treating period at a sterilizing temperature of approximately 200° Fahrenheit by means of the steam coil disposed in the conical portion of the tank. In carrying out the process in its preferred embodiment approximately 2000 gallons of tank water is pumped into the treating tank; following which 200 gallons of milk is added thereto, which is 10% of the tank water to be treated; the tank water and milk are then agitated preferably by injecting compressed air therein, to thereby thoroughly intermix the same; an alkali, such as milk of lime or caustic soda, is added during agitation to render the intermixture alkaline, care being taken to add only sufficient alkali to secure alkalinity, as an excessive amount of alkali will cause liberation of ammonia and decomposition of the protein matter; an acid, such as muriatic acid or lactic acid, is also added during agitation of the intermixture for the purpose of preventing liberation of ammonia and also for the purpose of creating a favorable condition for precipitation of the protein matter in the intermixture, the amount of acid used for the volume of intermixture herein described being approximately one quarter of a gallon. When the alkali and acid are added to the intermixture coagulation of the milk results, and the milk coagulum or heavy flocculent precipitate thus formed, consisting of voluminous and relatively large particles, unites with and envelops the relatively minute particles of protein matter in suspension in the tank water and causes precipitation of the same upon completion of the compressed air and steam treatment, approximately five hours being required to effect complete precipitation; the supernatant liquid, having been freed of all protein matter, is then drawn off through the tank drain cocks and discarded; the precipitate, containing all of the nutritious matter of both tank water and milk, is then discharged, through the outlet valve in the tank bottom, to rotary driers, wherein it is mixed with meat scraps or the like; and upon discharge from the driers is then ground or pulverized; following which is is sacked or packed in suitable containers and marketed as chicken food. In some instances the meat scraps are omitted and the resultant product forms and constitutes an ideal and excellent food for baby chickens, containing as it does 54% or better of protein.

Repeated chemical analysis of the supernatant liquid has shown that the same is substantially free of any protein or nutritious matter, and that while such liquid contains a certain percentage of solid matter no food value is left therein and in consequence said liquid may be discarded.

As hereinbefore set forth tank water contains approximately 92% water and 8% solid matter, it will therefore, be readily apparent and obvious that in order to recover the relatively small percentage of solid matter with the processes heretofore in use it was necessary and essential to evaporate a large volume of water which mode of procedure is both uneconomical and wasteful, while with the present process such water is drawn off and discarded when precipitation of the protein matter has been completed, thus effecting a considerable and material economy in cost of production.

The recovery of protein matter from distillery slop, or other by-products of fermentation is effected in substantially the identical manner to that herein described for recovering such matter from packing-house tank water, and in view of this fact the description of the process for treating the latter will suffice for both.

Manifestly, therefore, the primary and essential features of the present invention are: the utilization of the coagulative properties and qualities of milk for effecting precipitation of the minute particles of protein matter; the complete separation of all the protein matter from the treated liquid and the other organic substances contained therein having no food value; the elimination of evaporation and the cost thereof; and the provision of an economical, efficient and simplified process for the purposes herein described.

While I have herein described my process with sufficient detail to enable those skilled in the art to practice the same and to understand the advantages accruing therefrom, it is to be understood, that there is no intentional limitation herein to the particular ingredients herein named, nor their specific proportions, as I am aware that substitutions may be made in the constituent ingredients and variations in their proportions within reasonable limits without departing from the spirit of the invention or the benefits derivable therefrom.

Having thus fully described my invention, what I claim as new and desire to secure by Letters Patent is:

1. A process for recovering protein matter from packing-house tank water and distillery slop, which consists of adding milk thereto, and coagulating said milk, whereby the resultant coagulum unites with and precipitates said protein matter.

2. A process for recovering protein matter from packing-house tank water and distillery slop, which consists of maintaining same substantially at a sterlizing temperature during the treating period, adding milk thereto and thoroughly intermixing it therewith, and finally coagulating the milk whereby the resultant coagulum unites with and precipitates said protein matter during cooling of the intermixture.

3. A process for recovering protein matter from packing-house tank water and distillery slop, which consists of subjecting same to heat during the treating period, adding milk, subjecting the foregoing to the action of compressed air to agitate and thoroughly intermix the same, and finally coagulating the milk whereby the resultant coagulum unites with and precipitates said protein matter upon completion of agitation and during cooling of the intermixture.

4. A process for recovering protein matter from packing-house tank water and distillery slop, which consists of subjecting same to heat during the treating period, adding milk thereto, subjecting the foregoing to the action of compressed air to agitate and thoroughly intermix the same, alkalizing and acidifying the intermixture during agitation to form a coagulum therein for uniting with and precipitating said protein matter upon completion of agitation and during cooling of the intermixture.

5. A process for recovering protein matter from packing-house tank water and distillery slop, which consists of adding milk thereto and thoroughly intermixing the same therewith, alkalizing and acidifying the intermixture to form a milk coagulum therein for uniting with and precipitating said protein matter.

6. A process for recovering protein matter from packing-house tank water and distillery slop, which consists of adding milk thereto and thoroughly intermixing the same therewith, coagulating said milk whereby the resultant coagulum unites with and precipitates said protein matter, discarding the supernatant liquid, and finally drying the precipitate.

7. A process for recovering protein matter from packing-house tank water and distillery slop, which consists of adding milk thereto, agitating the same to thoroughly intermix the liquid and milk and coagulating the milk during agitation of the intermixture, whereby the resultant coagulum unites with and precipitates said protein matter upon completion of agitation.

8. A process for recovering protein matter from packing-house tank water and distillery slop, which consists of adding milk thereto, subjecting the liquid and milk to the action of compressed air to thoroughly intermix the same, and coagulating the milk during agitation of the intermixture, whereby the resultant coagulum unites with and precipitates said protein matter upon completion of agitation.

In testimony whereof I affix my signature.

RUDOLPH S. OPPENHEIM.